(12) United States Patent
Barsness et al.

(10) Patent No.: US 10,049,133 B2
(45) Date of Patent: Aug. 14, 2018

(54) QUERY GOVERNOR ACROSS QUERIES

(71) Applicant: International Business Machines Corporation, Armonk, NY (US)

(72) Inventors: Eric L. Barsness, Pine Island, MN (US); Daniel E. Beuch, Rochester, MN (US); Alexander Cook, Rochester, MN (US); Brian R. Muras, Otsego, MN (US); John M. Santosuosso, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

(21) Appl. No.: 15/336,447

(22) Filed: Oct. 27, 2016

(65) Prior Publication Data
US 2018/0121426 A1 May 3, 2018

(51) Int. Cl.
*G06F 7/00* (2006.01)
*G06F 17/30* (2006.01)

(52) U.S. Cl.
CPC .... *G06F 17/3046* (2013.01); *G06F 17/30469* (2013.01); *G06F 17/30477* (2013.01)

(58) Field of Classification Search
CPC .... G06F 3/0659; G06F 9/3836; G06F 19/327; G06F 3/0631; G06F 3/122; G06F 3/1264; G06F 9/5011; G06F 17/3046; G06F 17/30469; G06F 17/30477
USPC .................. 707/720, 708, 718, 737, 999.004
See application file for complete search history.

(56) References Cited

U.S. PATENT DOCUMENTS

| | | | |
|---|---|---|---|
| 5,325,525 A * | 6/1994 | Shan | G06F 9/52 712/28 |
| 7,107,262 B2 | 9/2006 | Dettinger et al. | |
| 7,130,838 B2 | 10/2006 | Barsness et al. | |
| 7,657,501 B1 * | 2/2010 | Brown | G06F 9/5083 707/999.002 |
| 9,275,102 B2 | 3/2016 | Santosuosso et al. | |
| 2004/0073549 A1 * | 4/2004 | Turkel | G06F 17/3046 |
| 2005/0192937 A1 * | 9/2005 | Barsness | G06F 9/50 |
| 2006/0190425 A1 * | 8/2006 | Chang | G06F 17/30256 |
| 2008/0306950 A1 * | 12/2008 | Richards | G06F 9/505 |
| 2009/0216718 A1 * | 8/2009 | Agrawal | G06F 17/30442 |
| 2010/0094852 A1 * | 4/2010 | Gupta | G06F 17/30306 707/706 |
| 2010/0095299 A1 * | 4/2010 | Gupta | G06F 9/4881 718/103 |
| 2010/0145929 A1 * | 6/2010 | Burger | G06F 17/30469 707/713 |
| 2010/0198807 A1 * | 8/2010 | Kuno | G06F 17/30463 707/713 |

(Continued)

*Primary Examiner* — Mohammed R Uddin
(74) *Attorney, Agent, or Firm* — Patterson + Sheridan, LLP

(57) ABSTRACT

Techniques are described for managing the execution of one or more groups of queries. Embodiments of the present disclosure may generally receive a group of queries to be executed against a database. Embodiments also determine, based on one or more attributes of the group of queries, an expected amount of resources that will be used in executing the group of queries against the database. Embodiments further schedule one or more queries of the group of queries for execution against the database based on the expected amount of resources to be used for the group of queries.

16 Claims, 7 Drawing Sheets

(56) References Cited

U.S. PATENT DOCUMENTS

| | | | |
|---|---|---|---|
| 2010/0229178 A1* | 9/2010 | Ito .......................... | G06F 9/5083 718/104 |
| 2011/0313999 A1* | 12/2011 | Bruno ............... | G06F 17/30463 707/718 |
| 2013/0024442 A1* | 1/2013 | Santosuosso ..... | G06F 17/30424 707/720 |
| 2013/0173597 A1* | 7/2013 | Do ........................ | G06F 9/5011 707/722 |
| 2014/0280034 A1* | 9/2014 | Harris ............... | G06F 17/30451 707/718 |
| 2015/0149501 A1* | 5/2015 | Prakash ................ | G06F 9/5027 707/769 |

\* cited by examiner

QUERY GOVERNOR ACROSS QUERIES

BACKGROUND

The present application generally relates to database management, and more particularly, to techniques for managing the execution of a group of queries.

Databases are computerized data storage and retrieval systems. A relational database management system is a computer database management system (DBMS) that uses relational techniques for storing and retrieving data. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests (i.e., queries) are often made using high-level query languages such as the Structured Query Language (SQL). Upon receiving such a request, the DBMS may execute the request against a corresponding database, and return any result of the execution to the requesting entity.

SUMMARY

One embodiment presented herein describes a method for managing execution of a group of queries. The method generally includes receiving a group of queries to be executed against a database. The method also includes determining, based on one or more attributes of the group of queries, an expected amount of resources that will be used in executing the group of queries against the database. The method further includes scheduling one or more queries of the group of queries for execution against the database based on the expected amount of resources to be used for the group of queries.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

BRIEF DESCRIPTION OF THE SEVERAL VIEWS OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this disclosure and are therefore not to be considered limiting of its scope, for the present disclosure may admit to other equally effective embodiments.

DETAILED DESCRIPTION

Figure 1:
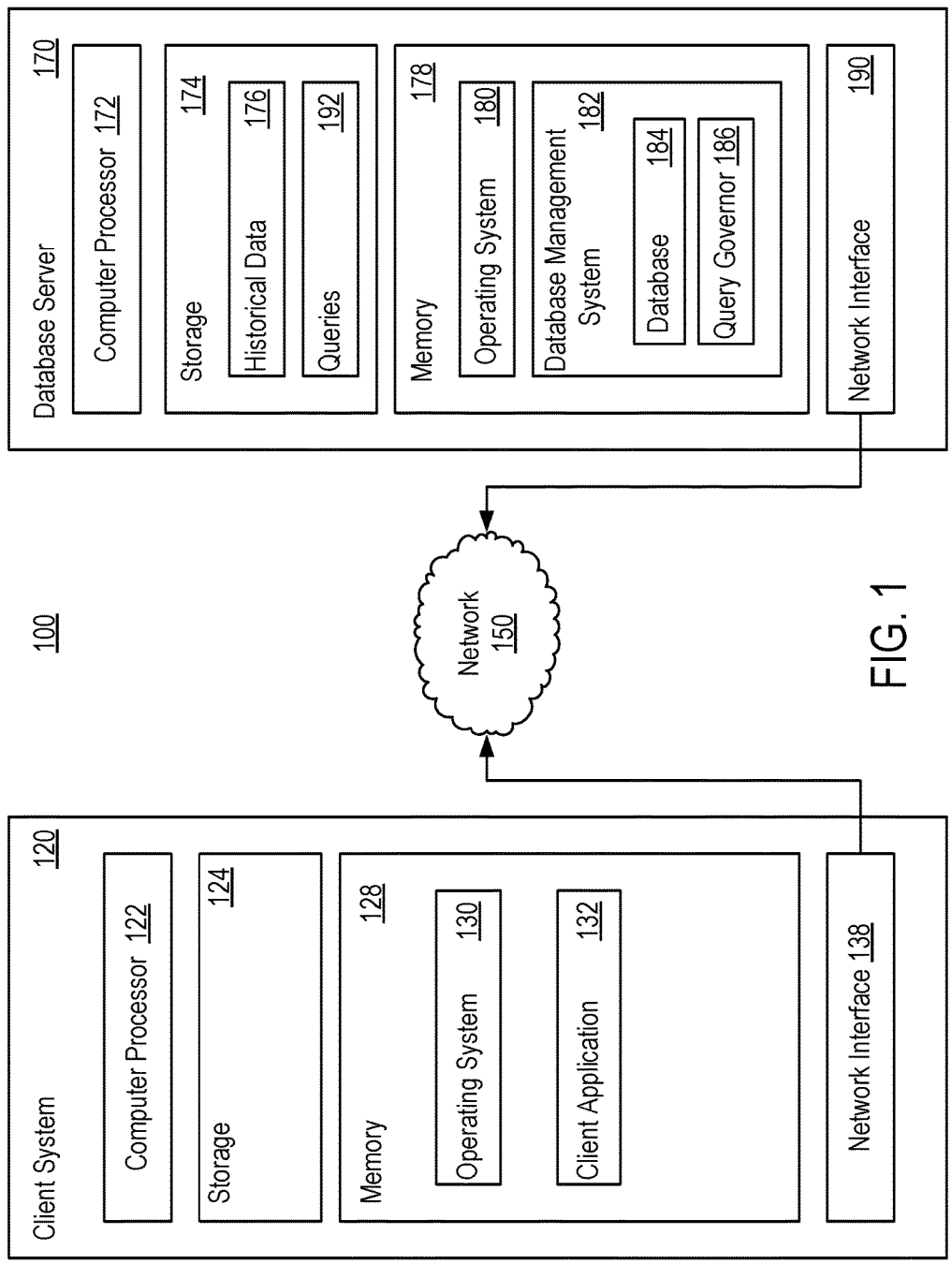
FIG. 1 is a block diagram illustrating a networked system for managing execution of a group of queries, according to one embodiment of the present disclosure.

Many DBMS include some form of query governor which generally controls how long a query may execute. For example, a query governor can prevent a query from executing if the expected amount of time to execute the query is above a predetermined amount of time. In one example, a query governor can control how long particular parts of a query (e.g., such as user defined functions (UDFs), the sort, etc.) may execute. In one example, a query governor may enable a database administrator to start executing a query and have the query time out (i.e., execution of the query is halted) if a predetermined amount of time elapses before the execution completes. Such functionality enables the DBMS to prevent a single query from tying up the DBMS resources for an excessive period of time. However, while current techniques enable the DBMS to manage the execution of single queries, current techniques are not able to provide such functionality for groups of queries, where each group includes multiple queries.

Embodiments described herein provide techniques for managing execution of a group of queries based on system resource availability. For example, before the database executes a query, a query governor for the DBMS can gather a plurality of queries to be executed against the database. Once gathered, the query governor can determine one or more groupings of the queries based on attributes of each query. For example, the query governor can group queries that are associated with a particular query type (e.g., read queries, update queries, join queries, specific UDFs, etc.), group queries associated with a particular user, application, job, etc., group queries known to execute against a database, and so on. In some cases, the group of queries may include multiple queries that the database is requested to execute in sequence (i.e., there may an ordering to the queries in the group).

Once the query governor determines one or more groups of queries, the query governor can determine an estimated amount of system resources (e.g., runtime, amount of memory, processor load, etc.) that will be used in processing a given group, and schedule one or more queries of the group of queries for processing based on the estimated amount of system resources. For example, assume that the query governor determines a grouping that includes queries previously known to execute against a database (e.g., such as a group of static SQL statements associated with an application). In this example, the query governor can determine an estimated runtime (and/or amount of memory, processor load, etc.) for executing all of the SQL statements against the database. Such determination, for example, can be based on historical resource data for previously executed instructions that are similar to the static SQL, the number and/or type of operations associated with an access plan for implementing the static SQL, etc.

Based on the determination, the query governor can decide how to schedule one or more of the individual queries in the group. In one example, the query governor can prevent an initial query of the group from executing against the database if the expected execution time (or runtime) for executing the group of queries exceeds a threshold execution time. In one example, the query governor can delay one or more queries of the group of queries from executing against the database if the expected amount of resources is above a threshold. In one example, the query governor can start executing one or more queries of the group of queries against the database, and stop executing a remaining one or more queries of the group of queries if an actual amount of used resources is above a threshold. In this manner, embodiments herein enable the DBMS to efficiently manage system resources for query execution by allowing the query governor to optimize queries at a grouping level, as opposed to optimizing each individual query that may be received by the DBMS.

In the following, reference is made to embodiments of the present disclosure. However, it should be understood that the present disclosure is not limited to specific described embodiments. Instead, any combination of the following features and elements, whether related to different embodiments or not, is contemplated to implement and practice the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the present disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the DBMS) available in the cloud. For example, the DBMS could execute on a computing system in the cloud and receive user requests (e.g., queries) to access databases managed by the DBMS. In such a case, a query governor determine one or more groupings of the received queries, determine an estimated amount of resources that will be used in executing the groups of queries, and schedule one or more of the queries in the groups based on the estimated amount of resources. Doing so allows a user to access the database data from any computing system attached to a network connected to the cloud (e.g., the Internet).

FIG. 1 is a block diagram illustrating a networked system for managing execution of a group of queries, according to one embodiment of the present disclosure. In the depicted embodiment, the system 100 includes a client system 120 and a database server 170, connected by a network 150. The client system 120 contains a computer processor 122, storage media 124, memory 128 and a network interface 138. Computer processor 122 may be any processor capable of performing the functions described herein. The client system 120 may connect to the network 150 using the network interface 138. Furthermore, as will be understood by one of ordinary skill in the art, any computer system capable of performing the functions described herein may be used.

In the pictured embodiment, memory 128 contains an operating system 130 and a client application 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. Generally, the client system 120 may submit requests (i.e., queries) over the network 150 to a DBMS running on the database server 170. For example, memory 128 includes client application 132, which is generally capable of generating queries. Once the client application 132 generates a query, the query may be submitted over the network 150 to a DBMS (e.g., DBMS 182) for execution. The operating system 130 may be any operating system capable of performing the functions described herein.

The term "query" specifies a set of commands for retrieving data from a database. Queries may take the form of a command language, such as the Structured Query Language (SQL), and enable users (e.g., administrators, programmers, developers, etc.) and programs to access data within the database. For instance, queries can be used to select, insert, update, find out the location of data, join tables, and so forth. Generally speaking, any requesting entity can issue queries against data in a database. For example, software applications (such as by an application running on the client system 120), and operating systems may submit queries to the database. These queries may be predefined (i.e., hard coded as part of an application) or may be generated in response to input (e.g., user input during an interactive session associated with an application). Upon receiving the request, the DBMS 182 on the database server 170 may execute the request against a database specified in the request, and then return the result of the executed request.

The database server 170 contains a computer processor 172, storage media 174, memory 178 and a network interface 190. Computer processor 172 may be any processor capable of performing the functions described herein. Storage media 174 contains historical data 176 and query groupings 192. The historical data 176 may include data regarding different types of queries executed against the database (e.g., database 184). For example, in one embodiment of the present disclosure, the historical data 176 includes data about the amount of system resources used in executing previously known queries. The query governor 186 may use such data when determining the estimated amount of system resources that will be used to process a group of queries. Querying groupings 192 includes metadata associated with one or more groups of queries. For example, such information may specify attributes (e.g., such as query type, association with a particular user, application, job, thread, etc.) of each group determined by the query governor. The database server 170 may connect to the network 150 using the network interface 190. Furthermore, as will be understood by one of ordinary skill in the art, any computer system capable of performing the functions described herein may be used.

In the pictured embodiment, memory 178 contains an operating system 180 and a DBMS 182. Although memory 178 is shown as a single entity, memory 178 may include one or more memory devices having blocks of memory associated with physical addresses, such as random access memory (RAM), read only memory (ROM), flash memory or other types of volatile and/or non-volatile memory. The DBMS 182 includes a database 184 and a query governor 186. Note that, in some embodiments, the database 184 can be separate from the DBMS 182 (e.g., within storage 174). The operating system 180 may be any operating system capable of performing the functions described herein.

Generally, the client application 132 may generate and submit queries to the DBMS 182 using the network 150. As noted above, it may be desirable for the database server 170 to process a query (e.g., execute the query against the database) only if the group of queries to which the query belongs does not use an excessive amount of system resources. Put differently, in one example, if the expected runtime (or execution time) for a particular group of queries is above a threshold execution time, the database server 170 may wish to reject and/or adjust processing of one or more individual queries (e.g., such as the initial query) of the group of queries. According to embodiments of the present disclosure, the query governor 186 may be configured to gather a plurality of received requests (queries) and determine, based on attributes of the queries, one or more groups of queries from the received requests. In one embodiment, the query governor 186 may temporarily store each received query in storage 174.

In one embodiment, the query governor 186 can group queries according to query type, examples of which include, but are not limited to, read or update queries, join queries of n tables (n>10), UDFs, and the like. In one embodiment, the query governor 186 can form a group of queries that are parallel in time (e.g., across multiple threads) and/or sequential in time (e.g., within one thread). In one embodiment, the query governor 186 can form a group of queries that are associated with a user (or group of users), an application (or group of applications), etc. In one embodiment, the query governor 186 can form a group of queries associated with a job or jobs based on priority. For example, the group of queries can be associated with "priority 1" jobs with no restriction on resources, "priority 2" jobs with only X resources, "priority 3" jobs with Y resources, etc. In one embodiment, the query governor 186 can form a group of queries known to execute against a table or set of tables. For example, the group could be defined as a sequence of queries known to execute against a database (e.g., SQL statements associated with a static program execution). Of course, the above examples are merely for illustrative purposes, and one of ordinary skill in the art will recognize that the query governor 186 may determine other groupings of queries based on attributes of the queries as well.

In some embodiments, the queries in any given group may be queries that the DBMS executes in sequence. For example, assuming the group includes multiple join queries, the multiple join queries may represent a set of operations that the DBMS has to execute for another set of operations. In such an example, there may be an ordering to the queries in the group. That is, the first join query in the group may have to be executed before the second join query; the second join query may have to be executed before the third join query; and so on. In such cases, techniques presented herein can prevent the first query from executing against the database if executing the group of queries would use an excessive amount of resources.

Once the query governor 186 determines a group of queries, the query governor 186 can calculate an estimated amount of system resources that will be used in executing the group of queries against the database 184. In some embodiments, the query governor 186 can determine an estimated (or expected) runtime for executing the group of queries against the database 184. For example, assuming the query governor 186 determines a group of multiple update queries, "update table 1, set column 1=?, where A=?," "update table 2, set column 1=?, where B=?," "update table 3, set column 1=?, where C=?," and so on, the query governor 186 may calculate the estimated amount of time for processing all of the update queries based on metadata associated with the tables in the database, amount of data to be changed, particular access plan chosen to implement the query, values in each query, processing capability (and other resource capability) of the database server 170, historical data 176, and the like. Using the first update query as a reference example, the DBMS 182 may keep statistics on tables such as how many rows per key or how many unique values are in a given column. Thus, the query governor 186 may use such statistics to determine that the first update query involves updating 100 rows in the database 184. In this example, the query governor 186 may estimate that such an operation, e.g., using an access plan that involves indexing through the table, will take 10 seconds. The query governor 186 may similarly do so for each update query in the group of update queries to determine the estimated runtime for executing all of the update queries in the group.

Additionally, in some embodiments, the query governor 186 can determine an estimated amount of at least one of memory, CPU consumption, logical I/O operations, etc., that will be used in executing all of the update queries in the group. In some cases, if the query governor 186 has previously executed a similar query to the type of query in the group, the query governor 186 may use the historical resource usage information (e.g., historical data 176) to determine the estimated amount of resources for processing the group of queries. Note, however, that the above examples are merely some of the ways that the query governor 186 may determine the estimated amount of resources to be used in processing a group of queries, and that one of ordinary skill in the art will recognize that the query governor 186 can use other methods to determine the estimated amount of system resources that will be used in processing a group of queries.

The query governor 186 can be configured to schedule one or more of the queries in a given group of queries based on the estimated amount of system resources. In one embodiment, the query governor 186 may stop a set of one or more queries in the group of queries from executing against the database (i.e., halt execution of the set of queries) if the query governor 186 determines that the amount of system resources that will be used in processing the group of queries exceeds a predetermined threshold amount of system resources. Continuing with the above example, if the query governor 186 determines that the estimated runtime (or execution time) for executing the update queries exceeds a threshold execution time of 45 seconds, the query governor 186 may decide to reject the initial query "update table 1, set column 1=?, where A=?" In another example, if the query governor 186 determines that the number of physical I/O operations required to execute all of the update queries exceeds a threshold number of physical I/O operations, the query governor 186 may decide to reject query "update table 1, set column 1=?, where A=?" Doing so allows the query governor 186 to prevent initiating execution of a group of queries when collectively the group of queries will use an excessive amount of system resources and negatively affect performance of the database server 170.

In one embodiment, as opposed to rejecting one or more queries in the group of queries, the query governor 186 can delay execution of one or more queries in the group of queries until an amount of available system resources exceeds a threshold. For example, assume the query governor 186 is controlling a series of queries in different threads (i.e., a group of queries from parallel threads). In this example, the query governor 186 may determine that there are different amounts of system resources (at different points of time) available for processing queries from the different threads. In such cases, if the query governor 186 determines that the amount of system resources that will be used to execute the queries from the different threads at a particular point in time exceeds the available amount of system resources at that time, the query governor 186 can delay one or more queries in one thread to increase the amount of system resources available for processing queries in one or more other threads. The query governor 186 may do so to prevent "thrashing" situations in the database server 170. That is, by allowing particular portions of a query stream to run with less competition, the query governor 186 may enable the DBMS to process queries faster, and in turn, reduce the amount of time in which any given thread is using the system resources (e.g., free up the amount of system resources more quickly).

In one embodiment, the query governor 186 can allow one or more queries in the group of queries to start executing against the database, but end (or halt), delay, and/or adjust execution of a remaining one or more queries in the group of queries if the available amount of system resources drops below a threshold. For example, after execution of a first one or more queries of the group of queries, the query governor 186 may determine the actual amount of resources used by the first one or more queries, and a remaining amount of resources available for executing a second one or more queries of the group of queries. If the remaining amount of resources is below a threshold, the query governor 186 may halt, delay, and/or adjust execution of the second one or more queries of the group of queries.

In some cases, the query governor's scheduling of the group of queries may be based on one or more attributes of the group. Assume, for example, that the query governor 186 determines a grouping that includes multiple static SQL statements associated with an application. In such a case, the query governor 186 may decide to not let a single SQL query of the application run, if collectively, the estimated amount of resources that will be used to execute all of the SQL exceeds a predetermined threshold amount of system resources. On the other hand, if the query governor 186 determines a grouping that includes queries received from a user during an interactive session, the query governor 186 may not know which queries the user is going to submit to the DBMS, and therefore may not be able to determine an estimated amount of system resources that will be used for the entire group (and reject individual queries of the group based on the determination). In such cases, however, the query governor 186 may decide to instead optimize the group by limiting the group's use of the system resources to a threshold amount of resources (e.g., resource limit). For example, the query governor 186 may decide that a certain amount of system resources (e.g., X % of memory, Y seconds of execution time, Z number of physical I/O operations, and the like) should be available for processing the group of queries received from the user during the interactive session. In one embodiment, the resource usage limit set by the query governor 186 can be an aggregation of resources used over time by a set of queries. In one embodiment, the resource usage limit set by the query governor 186 can be an amount of resource used at any particular point in time by a set of queries.

Once a limit is determined, the query governor 186 can monitor the processing of the group of queries, and if the query governor 186 determines that the group of queries is using an amount of system resources that is above (or approaching some threshold of) the limit, the query governor 186 can take action to halt execution of the group of queries, delay execution of the group of queries, adjust execution of the group of queries, etc. In one embodiment, the query governor 186 may adjust (or re-schedule) execution of the group by choosing different access plans for processing the queries of a group based on the resource limit. For example, assume the query governor 186 determines that a first access plan for processing a group of five queries that involves the creation of several temporary hash tables in order to implement each query of the group. If the query governor 186 determines that the group of five queries are allowed to use X % of memory, the query governor 186 may determine, e.g., by the fourth query, that using the first access plan to implement the fourth query will cause the group to exceed the X % of memory limit. In such cases, embodiments herein allow the query governor 186 to determine a second access plan (e.g., an indexing method as opposed to creating temporary hash tables) for implementing the fourth and fifth queries of the group that will use less amount of memory, such that the processing of the group does not exceed the X % memory limit.

In some embodiments, the query governor 186 may continually adjust the resource usage limit based on monitoring the actual amount of resources used in processing queries of the group of queries. For example, assume the query governor 186 estimates a runtime of 10 seconds for a first query of a group, but the execution time for the first query uses 7 seconds. In such cases, the query governor 186 can adjust down the group's resource usage. In some cases, the query governor 186 can increase the runtime limit for one or more subsequent queries in the group of queries. In this manner, the query governor 186 can continually refine the group usage and/or resource usage limit for a group of queries. Note that FIG. 1 illustrates merely one reference example of a networked system that can be configured to manage execution of a group of queries using the techniques presented herein. More generally, those of ordinary skill in the art will recognize that other configurations of the networked system can be used to implement the techniques presented herein.

Figure 2:
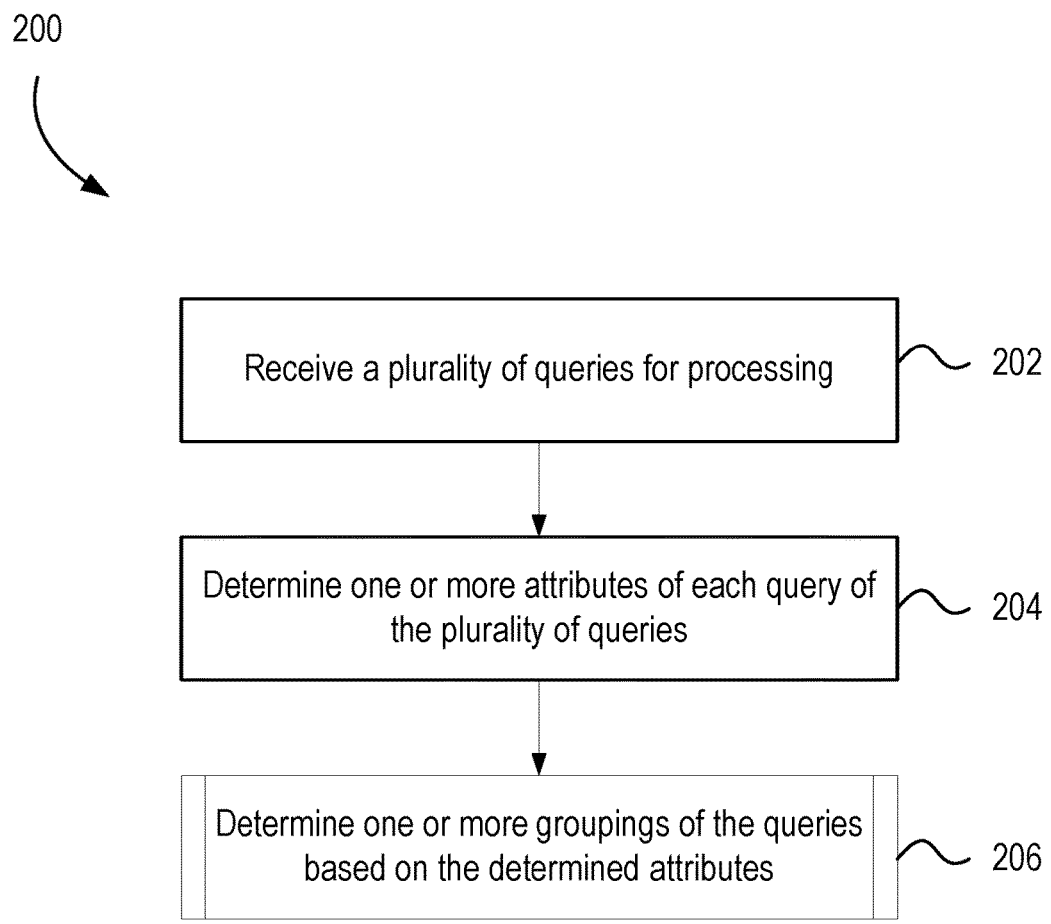
FIG. 2 is a flow chart illustrating a method for determining one or more groupings of queries, according to one embodiment of the present disclosure.

FIG. 2 is a flow chart illustrating a method 200 for determining one or more groupings of queries, according to one embodiment of the present disclosure. As shown, the method 200 begins at block 202, where the query governor 186 receives a plurality of queries for processing (e.g., execution against the database 184). In embodiments herein, as opposed to starting execution of each received query, the query governor 186 may first determine one or more groupings of the queries in order to optimize scheduling for the entire group (e.g., as opposed to individual queries). For example, at block 204, the query governor 186 determines one or more attributes of each query of the plurality of queries. As noted above, for example, the query governor 186 can determine, for each query, the type of query, whether the query is associated with a particular user, application, job, or priority of job, whether the query is associated with a particular thread, the type of operations specified in the query, whether the query has been previously executed against the database, and so on. At block 206, the query governor 186 determines one or more groupings of the queries based on the determined attributes.

Figure 3:
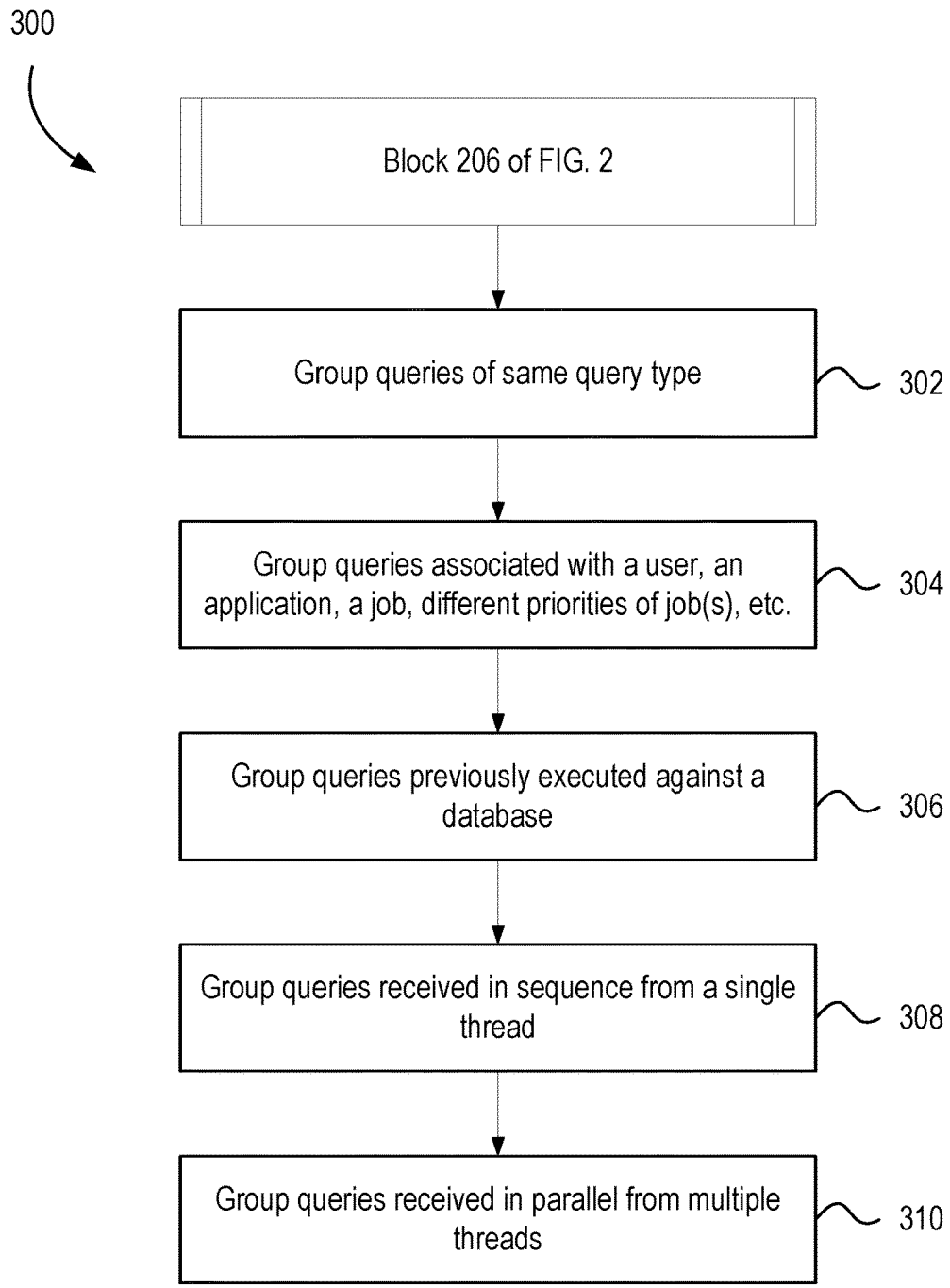
FIG. 3 is a flow chart illustrating a method for determining one or more groupings of queries, according to one embodiment of the present disclosure.

FIG. 3 is a flow chart illustrating a method 300 for determining one or more groupings of queries, according to one embodiment. Method 300 begins at block 206 of FIG. 2 when the query governor 186 determines groupings of queries based on attributes of the queries. Note that out of the blocks 302-310, the query governor 186 may choose to implement one or more of the blocks 302-310 for a plurality of received queries. At block 302, the query governor 186 determines a group of queries of a same query type (e.g., a group of read queries, a group of update queries, group of join queries, a group of UDFs, etc.). At block 304, the query governor 186 determines a group of queries associated with one or more of a user (or group of users), an application (or group of applications), a job, different priorities of job(s), etc.

At block 306, the query governor 186 determines a group of queries known to previously execute against the database. For example, as noted above, in one embodiment, such a group could include multiple SQL queries associated with a static program (or application). In one embodiment, such a group could include a series of queries that were executed against the database over a particular period of time (e.g., from 2 PM to 4 PM everyday or on one or more particular days). At block 308, the query governor 186 determines a group of queries received in sequence from a single thread. At block 310, the query governor 186 determines a group of queries received in parallel from multiple threads. For example, as noted above, the query governor 186 can be configured to simultaneously control a sequence of queries from multiple different threads. Note, however, that the above examples are for illustrative purposes only, and one of ordinary skill in the art will quickly recognize that groupings based on other attributes can be determined by the query governor 186 as well.

Figure 4:
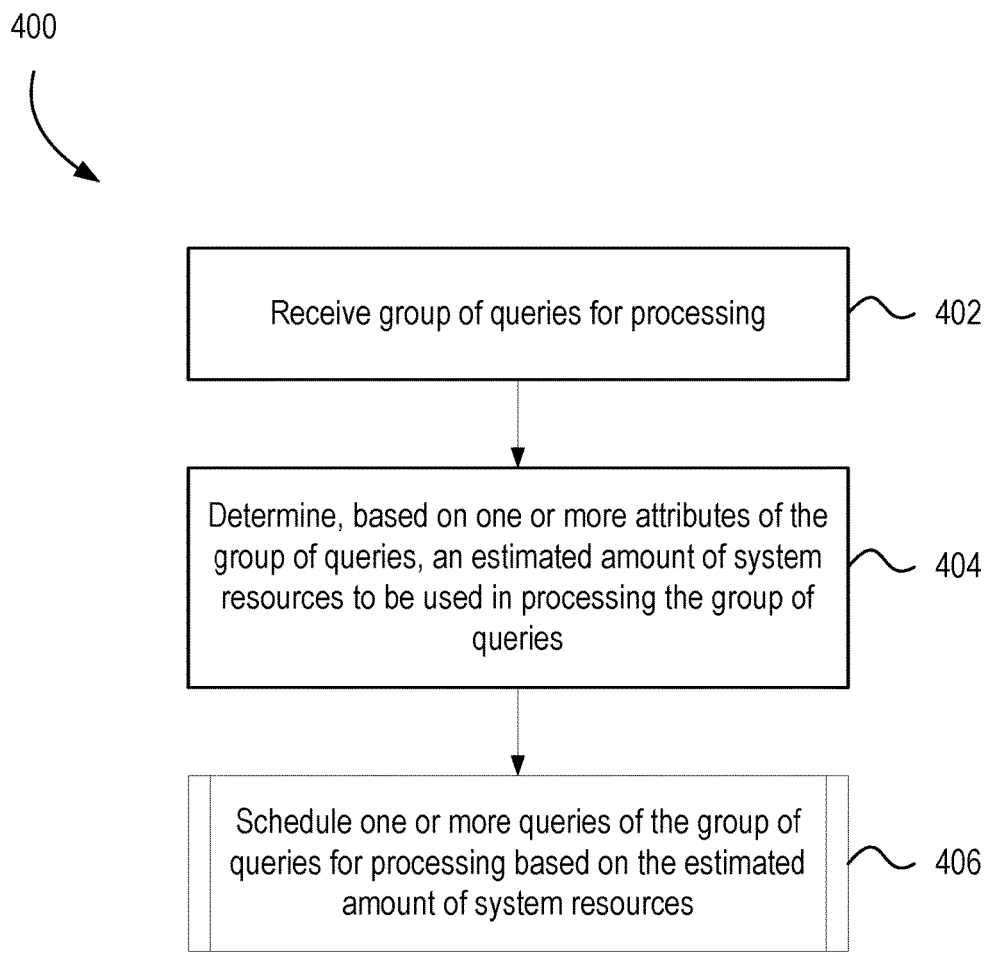
FIG. 4 is a flow chart illustrating a method for managing execution of a group of queries, according to one embodiment of the present disclosure.

FIG. 4 is a flow chart illustrating a method 400 for managing execution of a group of queries, according to one embodiment. As shown, the method 400 begins at block 402 where the query governor 186 receives a group of queries for processing. As noted above, such a group can include a group of queries of a same query type, a group of queries associated with one of a user, application, job, or thread(s), a group of queries known to execute against a database, etc. At block 404, the query governor 186 determines, based on one or more attributes of the group of queries, an estimated amount of system resources to be used in processing the group of queries. At block 406, the query governor 186 schedules one or more queries of the group of queries for processing based on the estimated amount of system resources.

As noted above, in one embodiment, the scheduling may include halting or initiating execution of one or more queries (e.g., a first query) of the group of queries based on the estimated amount of resources. In one embodiment, the scheduling may include delaying and/or adjusting an execution of one or more queries of the group of queries based on the estimated amount of resources. In one embodiment, the scheduling may include executing a first one or more queries of the group of queries against the database, and re-scheduling a second one or more queries of the group of queries based on an amount of resources used for the first one or more queries.

Figure 5:
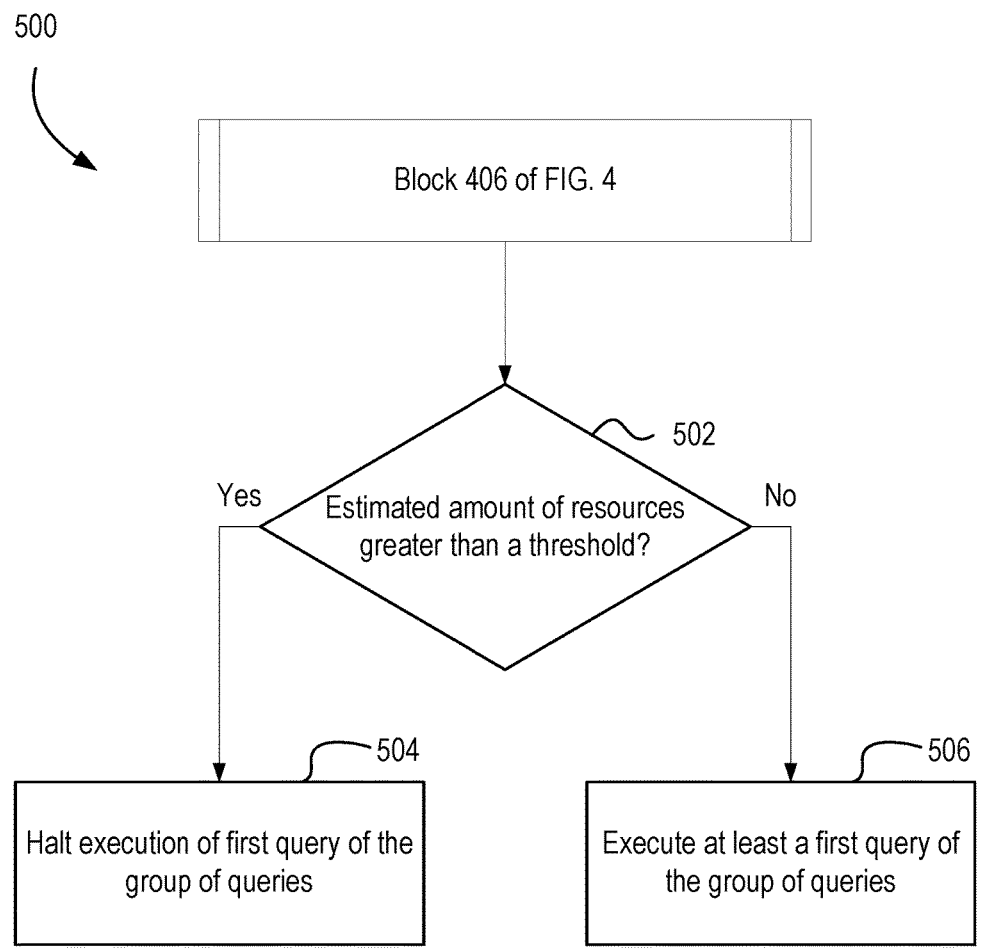
FIG. 5 is a flow chart illustrating a method for scheduling a group of queries, according to one embodiment of the present disclosure.

FIG. 5 is a flow chart illustrating a method 500 for scheduling a group of queries, according to one embodiment. Method 500 begins at block 406 of FIG. 4 when the query governor 186 schedules one or more queries of the group of queries for processing based on the estimated amount of system resources. At block 502, the query governor 186 determines whether the estimated amount of system resources is greater than a threshold. If so, the query governor 186 halts execution of at least a first query of the group of queries. If not, the query governor 186 executes at least a first query of the group of queries. As noted above, in some embodiments, when executing at least a first query of the group of queries, the query governor 186 may determine to re-schedule one or more subsequent queries of the group of queries based on the amount of resources remaining for the group of queries. Doing so allows the query governor 186 to optimize the processing of queries by the DBMS 182 at a grouping level (as opposed to optimizing each individual query), which allows for efficient use of system resources on the database server 170.

Figure 6:
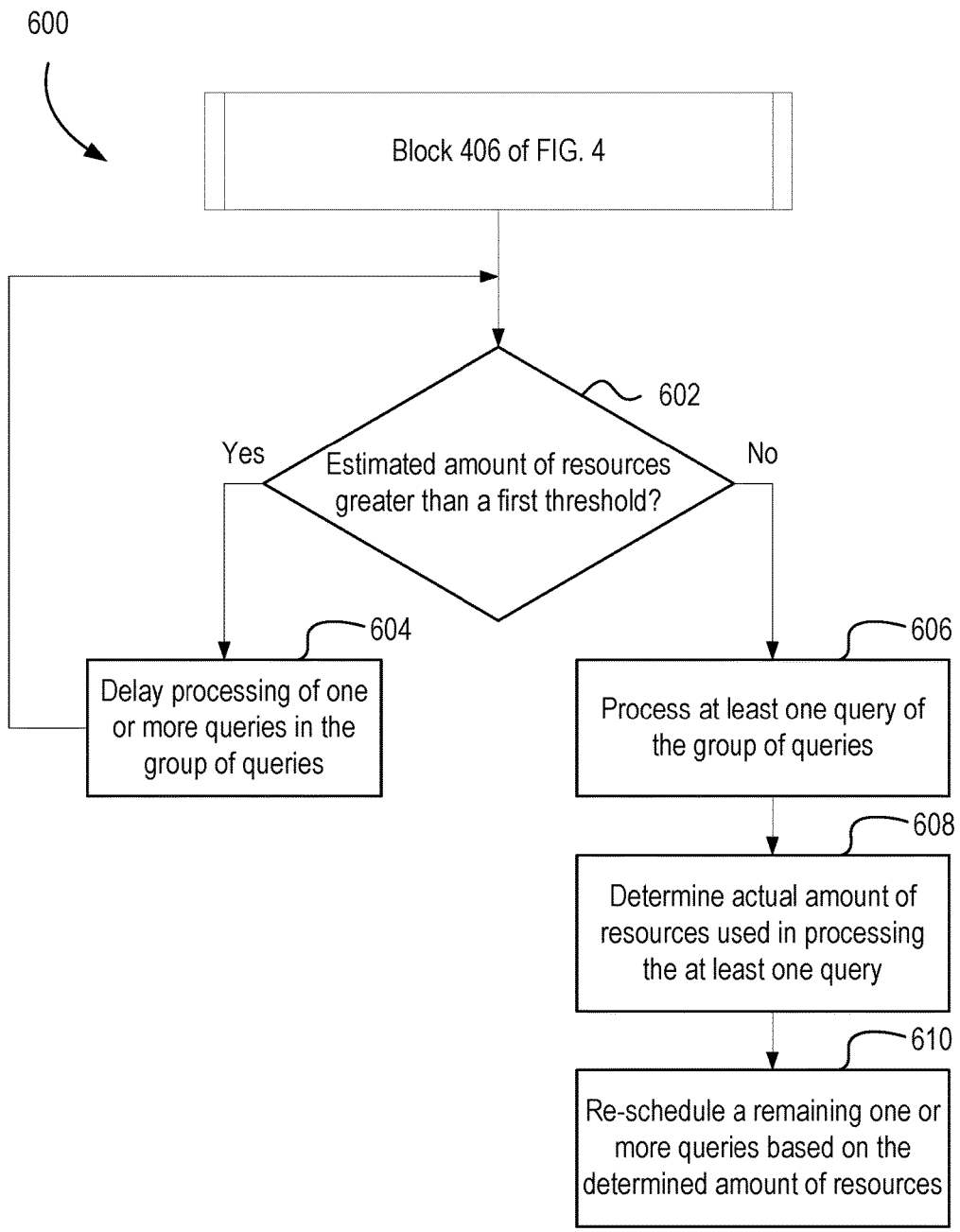
FIG. 6 is a flow chart illustrating another method for scheduling a group of queries, according to one embodiment of the present disclosure.

FIG. 6 is a flow chart illustrating another method 600 for scheduling a group of queries, according to one embodiment. Method 600 begins at block 406 of FIG. 4 when the query governor 186 schedules one or more queries of the group of queries for processing based on the estimated amount of system resources. At block 602, the query governor 186 determines whether the estimated amount of resources is greater than a first threshold. If so, the query governor 186 can delay processing of one or more queries of the group of queries until it determines that a sufficient amount of resources are available. As shown, for example, the query governor 186, at block 604, delays processing of one or more queries in the group of queries and proceeds to block 602.

On the other hand, if the query governor 186 determines that the estimated amount of resources are below the first threshold, the query governor 186 processes at least one query of the group of queries (block 606). Once processed, the query governor 186 determines an actual amount of resources used in processing the at least one query (block 608) and a remaining amount of resources available for the rest of the group of queries based on the actual amount of resources. Based on the determination, the query governor re-schedules a remaining one or more queries based on the determined amount of resources. In embodiments, re-scheduling may include at least one of halting, delaying, and/or adapting execution (e.g., changing an access plan) of one or more remaining queries of the group of queries if the query governor 186 determines that the actual amount of resources used is above a second threshold. Such second threshold, e.g., may be set to prevent the execution of remaining queries in the group if execution of such queries would cause the group to exceed the first threshold.

As noted above, in some embodiments, the query governor 186 can group queries that are parallel in time (e.g., across multiple threads) and/or sequential in time (e.g., within one thread) and appropriately schedule them based on the amount of available system resources (e.g., in database server 170). Referring to block 602, for example, if the query governor 186 determines that estimated amount of resources for processing multiple queries across different threads exceeds the available amount of system resources, the query governor 186 can delay processing of one or more SQL in a first thread to allow a second thread to have more resources available. In this manner, the query governor 186 can prevent thrashing by scheduling the queries such that only portions of the group of queries run at any particular time (e.g., with less competition for resources from other queries from other threads of the group of threads).

Figure 7:
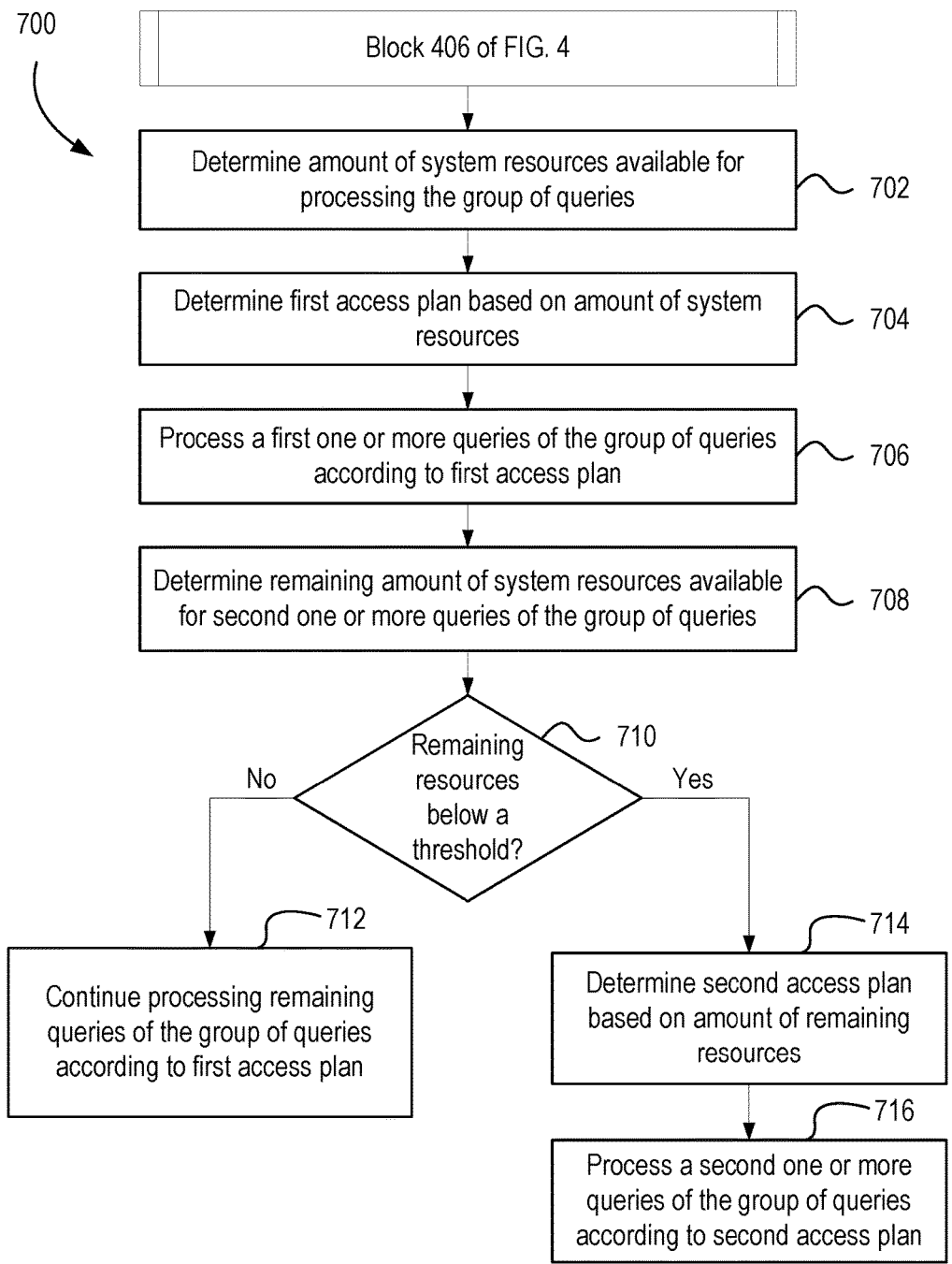
FIG. 7 is a flow chart illustrating another method for scheduling a group of queries, according to one embodiment of the present disclosure.

FIG. 7 is a flow chart illustrating another method 700 for scheduling a group of queries, according to one embodiment. Method 700 begins at block 406 of FIG. 4 when the query governor 186 schedules one or more queries of the group of queries for processing based on the estimated amount of system resources. At block 702, the query governor 186 determines an amount of system resources available for processing the group of queries. At block 704, the query governor 186 determines a first access plan based on the amount of system resources. For example, assuming that the query governor 186 determines (at block 702) that it is allowed to use 60% of memory to execute a group of six update queries, the query governor 186 may choose an access plan that uses 10% of memory to implement each update query. At block 706, the query governor 186 processes a first one or more queries of the group of queries according to the first access plan.

At block 708, the query governor 186 determines the remaining amount of system resources available for a second one or more queries of the group of queries. At block 710, the query governor 186 determines whether the remaining resources are below a threshold. If not, the query governor 186 continues processing the remaining queries of the group of queries according to the first access plan. In some embodiments, after block 712, the query governor 186 may proceed to block 710. On the other hand, if the query governor 186 determines, at block 710, that the amount of remaining resources are not below a threshold, the query governor 186 determines a second access plan based on the amount of resources (block 714), and processes a second one or more queries of the group of queries according to the second access plan (block 716).

Continuing with the above example of six update queries, assume that after processing three of the update queries, the query governor 186 determines that 40% of the memory has been used for the group of queries. In such a case, the query governor 186 can choose a different access plan and/or modify the access plan to use less memory when implementing the fourth, fifth and sixth update queries, such that the amount of memory used by the group remains below the 60% system memory threshold. In this manner, the query governor disclosed herein can optimize different portions of a query group based on the amount of resources available for processing the entire group, in order to ensure efficient use of system resources.

Advantageously, embodiments herein enable the DBMS to efficiently manage system resources for query execution by allowing the query governor to optimize queries at a grouping level, as opposed to optimizing each individual query that may be received by the DBMS. Embodiments also enable the DBMS to run portions of queries at a time (with fewer occurring at once) to prevent thrashing, which in turn allows for a faster execution of the entire group of queries against the database.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method, comprising:
receiving a group of multiple queries to be executed against a database;
determining, based on one or more attributes of each query in the group of multiple queries, an expected amount of resources that will be used in executing the group of multiple queries against the database;
scheduling the group of multiple queries for execution against the database based on the expected amount of resources to be used for the group of multiple queries, wherein scheduling the group of multiple queries comprises determining a first access plan for executing the group of multiple queries against the database based on the expected amount of resources; and
after scheduling the group of multiple queries:
executing a first plurality of queries of the group of multiple queries against the database according to the first access plan;
determining an amount of resources used in executing the first plurality of queries against the database;
rescheduling a remaining second plurality of queries of the group of multiple queries based on the determined amount of resources used for the first plurality of queries, wherein rescheduling the remaining second plurality of queries comprises determining a second access plan, different from the first access plan, to use for executing the remaining second plurality of queries of the group of multiple queries against the database; and
executing the remaining second plurality of queries of the group of multiple queries against the database according to the second access plan.

2. The computer-implemented method of claim 1, wherein rescheduling the remaining second plurality of queries further comprises delaying the execution of the remaining second plurality of queries of the group of queries against the database.

3. The computer-implemented method of claim 2, wherein delaying the execution of the remaining second plurality of queries comprises delaying a set of queries in a first thread to increase an amount of resources available for executing a set of queries in a second thread against the database.

4. The computer-implemented method of claim 1, wherein rescheduling the remaining second plurality of queries further comprises adjusting an amount of resources available for executing the remaining second plurality of queries.

5. The computer-implemented method of claim 1, wherein the expected amount of resources comprises at least one of an expected execution time, an expected amount of memory, and an expected load on one or more processors.

6. The computer-implemented method of claim 1, wherein the group of multiple queries comprises a plurality of queries of a same query type.

7. The computer-implemented method of claim 1, wherein the group of multiple queries comprises at least one of a group of queries received in sequence from a single processing thread, and a group of queries received in parallel from multiple processing threads.

8. The computer-implemented method of claim 1, wherein the group of multiple queries comprises a plurality of queries associated with at least one of a user, an application, and one or more operations.

9. The computer-implemented method of claim 1, wherein the group of multiple queries comprises a plurality of queries previously executed against the database.

10. A system, comprising:
a computer processor; and
a memory containing a program that, when executed on the computer processor, performs an operation, comprising:
receiving a group of multiple queries to be executed against a database;

determining, based on one or more attributes of each query in the group of multiple queries, an expected amount of resources that will be used in executing the group of multiple queries against the database;

scheduling the group of multiple queries for execution against the database based on the expected amount of resources to be used for the group of multiple queries, wherein scheduling the group of multiple queries comprises determining a first access plan for executing the group of multiple queries against the database based on the expected amount of resources; and after scheduling the group of multiple queries:
executing a first plurality of queries of the group of multiple queries against the database according to the first access plan;
determining an amount of resources used in executing the first plurality of queries against the database;
rescheduling a remaining second plurality of queries of the group of multiple queries based on the determined amount of resources used for the first plurality of queries, wherein rescheduling the remaining second plurality of queries comprises determining a second access plan, different from the first access plan, to use for executing the remaining second plurality of queries of the group of multiple queries against the database; and
executing the remaining second plurality of queries of the group of multiple queries against the database according to the second access plan.

11. The system of claim 10, wherein rescheduling the remaining second plurality of queries further comprises:
delaying the execution of the remaining second plurality of queries of the group of multiple queries against the database.

12. The system of claim 11, wherein delaying the execution of the remaining second plurality of queries comprises delaying a set of queries in a first thread to increase an amount of resources available for executing a set of queries in a second thread against the database.

13. The system of claim 10, wherein rescheduling the remaining second plurality of queries further comprises adjusting an amount of resources available for executing the remaining second plurality of queries against the database.

14. The system of claim 10, wherein the expected amount of resources comprises at least one of an expected execution time, an expected amount of memory, and expected load on one or more processors, and wherein the group of multiple queries comprises a plurality of queries of a same query type, a plurality of queries associated with at least one of a user, an application, and one or more operations, or a plurality of queries previously executed against the database.

15. A computer program product, comprising:
a non-transitory computer-readable storage medium having computer readable program code embodied therewith, the computer readable program code comprising:
computer readable program code to receive a group of multiple queries to be executed against a database;
computer readable program code to determine, based on one or more attributes of each query the group of multiple queries, an expected amount of resources that will be used in executing the group of multiple queries against the database;
computer readable program code to schedule the group of multiple queries for execution against the database based on the expected amount of resources to be used for the group of multiple queries, wherein the computer readable program code to schedule the group of multiple queries comprises computer readable program code to determine a first access plan for executing the group of multiple queries against the database based on the expected amount of resources; and
computer readable program code to, after scheduling the group of multiple queries:
execute a first plurality of queries of the group of multiple queries against the database according to the first access plan;
determine an amount of resources used in executing the first plurality of queries against the database;
reschedule a remaining second plurality of queries of the group of multiple queries based on the determined amount of resources used for the first plurality of queries, wherein the computer readable program code to reschedule the remaining second plurality of queries comprises computer readable program code to determine a second access plan, different from the first access plan, to use for executing the remaining second plurality of queries of the group of multiple queries against the database; and
execute the remaining second plurality of queries of the group of multiple queries against the database according to the second access plan.

16. The computer program product of claim 15, wherein the computer readable program code to reschedule the remaining second plurality of queries further comprises:
computer readable program code to delay the execution of the remaining second plurality of queries of the group of multiple queries against the database.

* * * * *